United States Patent
Henderer et al.

(10) Patent No.: US 7,144,208 B2
(45) Date of Patent: Dec. 5, 2006

(54) LOW TORQUE TAP

(75) Inventors: Willard E. Henderer, Evans, GA (US); Alan L. Barrows, Hadley, MA (US); Steven R. Burns, East Ryegate, VT (US); Dennis J. Greene, Bernardston, MA (US)

(73) Assignee: Kennametal Inc., Latrobe, PA (US)

( * ) Notice: Subject to any disclaimer, the term of this patent is extended or adjusted under 35 U.S.C. 154(b) by 390 days.

(21) Appl. No.: 10/862,870

(22) Filed: Jun. 7, 2004

(65) Prior Publication Data

US 2005/0271486 A1 Dec. 8, 2005

(51) Int. Cl.
*B23B 5/06* (2006.01)

(52) U.S. Cl. .................. 408/144; 76/115; 408/222; 470/198

(58) Field of Classification Search .............. 408/144, 408/215, 216, 219, 222; 470/198, 199; 76/101.1, 76/108.1, 115, 117, 108.6; *B23G 5/06*
See application file for complete search history.

(56) References Cited

U.S. PATENT DOCUMENTS

| | | | |
|---|---|---|---|
| 1,165,822 A * | 12/1915 | Wells | 408/219 |
| 1,542,893 A | 6/1925 | Kreutzberger | |
| 1,676,482 A | 7/1928 | Lapotterie | |
| 1,845,063 A | 2/1932 | Trbojevich | |
| 1,912,517 A | 6/1933 | De Lapotterie | |
| 2,202,236 A * | 5/1940 | Stimson | 408/222 |
| 2,240,840 A | 5/1941 | Fischer | |
| 2,351,827 A | 6/1944 | McAllister | |
| 2,384,565 A | 9/1945 | Schaufus | |
| 2,511,470 A | 6/1950 | Johnson | |
| 2,823,574 A | 2/1958 | Rosan | |
| 2,991,491 A | 7/1961 | Welles, Jr. | |
| 3,125,772 A | 3/1964 | Beck | |
| 3,171,146 A | 3/1965 | Moss et al. | |
| 3,209,383 A | 10/1965 | Carlson | |
| 3,237,485 A | 3/1966 | Van Vleet | |
| 3,246,351 A | 4/1966 | Lorence | |

(Continued)

FOREIGN PATENT DOCUMENTS

JP    04111714 A   *   4/1992

(Continued)

OTHER PUBLICATIONS

Technical Help to Exporters Translation, DIN 376, Jun. 1981, "Machine taps (tapper taps) for ISO coarse-pitch metric threads M 1.6 to M 68," Deutsches Institut fur Normung, Berlin, West Germany.

(Continued)

*Primary Examiner*—Daniel W. Howell
(74) *Attorney, Agent, or Firm*—Larry R. Meenan

(57) ABSTRACT

A low torque tap includes a shank portion with a driving square and a thread cutting portion. The thread cutting portion includes a threaded body with one or more asymmetrical straight flutes that run essentially parallel to a longitudinal axis of the tap. The thread cutting portion also includes one or more short angular flutes or spiral points and a tapered chamfer. For tapping steel alloys, the cutting edges of the straight flutes and the spiral points have a rake or chordal hook angle of between about 5 and 15 degrees. For tapping ferrous materials, the tap is made from molybdenum-enriched high-speed steel and may be coated with a wear-resistant, friction-reducing layer. A second, outer layer, such as molybdenum disulfide, may be applied over the wear-reducing layer for further reduction in friction. For tapping non-ferrous materials, the tap may be coated with a layer of material containing carbon.

24 Claims, 2 Drawing Sheets

U.S. PATENT DOCUMENTS

| | | | |
|---|---|---|---|
| 3,328,814 A * | 7/1967 | Hudson | 408/220 |
| 3,390,410 A | 7/1968 | Bridges | |
| 3,767,544 A * | 10/1973 | Novosel et al. | 205/683 |
| 3,775,792 A | 12/1973 | Leonard | |
| 3,881,837 A | 5/1975 | Novosel et al. | |
| 4,054,426 A | 10/1977 | White | |
| 4,266,449 A | 5/1981 | Bielby | |
| 4,708,542 A | 11/1987 | Emanuelli | |
| 5,033,919 A | 7/1991 | Choe | |
| 5,035,019 A | 7/1991 | Dias | |
| 5,037,251 A | 8/1991 | Roth | |
| 5,222,847 A * | 6/1993 | Hiyama et al. | 408/222 |
| 5,352,067 A | 10/1994 | Arai et al. | |
| 5,487,626 A | 1/1996 | Von Holst et al. | |
| 5,526,716 A | 6/1996 | Arai et al. | |
| 5,785,522 A | 7/1998 | Bergstrom et al. | |
| 5,797,710 A | 8/1998 | Sawabe et al. | |
| 5,902,079 A | 5/1999 | Moore | |
| 5,993,120 A | 11/1999 | Giessler | |
| 6,213,693 B1 | 4/2001 | Kato | |
| 6,217,267 B1 | 4/2001 | Sugano et al. | |
| 6,284,366 B1 | 9/2001 | Konig et al. | |
| 6,386,954 B1 | 5/2002 | Sawabe et al. | |
| 6,514,148 B1 | 2/2003 | Glimpel et al. | |
| 6,554,550 B1 | 4/2003 | Chapel et al. | |
| 6,702,981 B1 * | 3/2004 | Hetzner | 420/112 |
| 6,858,333 B1 * | 2/2005 | Henderer | 428/698 |
| 7,060,345 B1 * | 6/2006 | Fukui et al. | 428/216 |
| 2003/0078109 A1 | 4/2003 | Hikosaka et al. | |

FOREIGN PATENT DOCUMENTS

| | | | |
|---|---|---|---|
| JP | 05138439 A * | 6/1993 | |
| JP | 08025142 A * | 1/1996 | |
| JP | 2001353623 A * | 12/2001 | |
| JP | 2005279832 A * | 10/2005 | |
| WO | WO 02/087813 A1 | 11/2002 | |

OTHER PUBLICATIONS

Technical Help to Exporters Translation, DIN 371, Jun. 1981, "Machine taps with Reinforced Shank; for coarse-pitch metric ISO threads M 1 to M 10," Deutsches Institut fur Normung, Berlin, West Germany.

Technical Help to Exporters Translation, DIN 374, Jun. 1981, "Machine screwing taps, for fine pitch metric ISO threads M 1.6 to M 52," Deutsches Institut fur Normung, Berlin, West Germany.

An American National Standard, "Taps: Ground and Cut Threads (Inch and Metric Sizes)," The American Society of Mechanical Engineers, ASME B94.9-1999 (Revision of ASME/ANSI B94.9-1987), New York, NY, 2000, pp. ix, x, 26, 27, 29.

W. E. Henderer, "On the Mechanics of Tapping by Cutting," Journal of Engineering for Industry, Feb. 1977, pp. 257-262.

* cited by examiner

LOW TORQUE TAP

CROSS-NOTING TO RELATED APPLICATIONS

This application is related to U.S. patent application Ser. No. 10/267,387, filed on Oct. 9, 2002, titled a "Tool with a Wear Resistant Low Friction Coating and Method of Making the Same," the entire contents of which is incorporated herein by reference.

BACKGROUND OF THE INVENTION

1. Field of the Invention

The invention relates in general to a tap tool, and in particular, to a tap tool designed for threading with low torque internal holes, whereby the tap is manufactured from a molybdenum-enriched high-speed steel including a shank with a straight flute form having a positive rake angle and a short fluted section at an angle to the tap's axis, and for use when tapping ferrous materials coated with a transition metal nitride, carbide or oxide, and coated with an optional friction-reducing top layer, and for use when tapping non-ferrous materials coated with a layer containing carbon.

2. Description of the Related Art

Mechanisms and machine components requiring screw threads have a long history in technology. Specifically, the application of screw threads as fastener components dominates all other means to join parts into assemblies. Although there are many ways to generate screw threads both internal as well as external, experience has shown that taps are the favored means to generate the internal screw thread. There currently exist two tapping methods to generate internal screw threads. The dominant tapping method is by cutting and removing material from the walls of a hole to produce a helical screw thread. Alternatively, internal screw threads can be created by displacing material to cold form an internal screw thread.

Considering the method of forming internal screw threads by displacing material, numerous designs exist of so-called forming taps. However, thread forming taps inherently require much higher torque than cutting taps, and form a poorly shaped thread profile at the minor diameter. For these reasons, forming taps are not favored in many tapping applications.

Cutting taps take on many geometrical forms; the primary difference is the configuration of the flutes. The original cutting tap form is the straight fluted tap that characteristically has straight flutes parallel to the axis of the tap. Although this design works well when the chips produced by the tap are discontinuous and short, the design does not work well in ductile steel alloys that have continuous chips that bind in the flutes of the tap. This problem is severe when tapping deep holes, and frequently results in tap breakage. An alternative tap design has a helical spiral flute that forces the chip out of the hole in a direction that depends on the direction of the helical rotation of the flute relative to the thread rotation. This design prevents chips building up in the flutes of the tap, except when friction-reducing and life-enhancing coatings, such as titanium nitride, are used. Such friction-reducing coatings produce thin, long continuous chips that are not easily ejected by the helical flutes and the chips subsequently pack the flute, frequently causing the tap to break.

Taps with a combination of straight flutes and short angular flutes at the starting chamfered end of the tap are the most effective cutting tap design for tapping through holes. Known in the art as spiral pointed taps, this design allows the chip to be forced ahead of the motion of the tap and effectively avoids chip packing problems that occur when tapping deep holes with straight fluted or spiral fluted taps. In such existing art, the straight flutes of spiral pointed taps may either have a symmetrical form with a constant radius, or a more complex asymmetrical form that consists of a straight cutting face and multiple radii. These conventional taps with a symmetrical flute form typically have a negative chordal hook, as shown in FIG. 6, which results in cutting with higher torque when the tap wears down. In addition to effectively tapping through holes, spiral pointed taps can also be used to tap blind holes with sufficient clearance for chip accumulation at the bottom of the hole.

It is well known that cutting tools generate temperatures that are high enough to limit the life of the tool, thereby reducing the effective cutting speed that can be used. The temperature that is generated during cutting or forming depends on the frictional properties between the tool and the work material. The wear rate can be reduced and the performance of cutting tools can be improved by reducing friction and consequently temperature. Additionally, the risk of softening high-speed steel tools by over tempering can be avoided by reducing cutting temperatures.

Taps may be manufactured from a variety of heat and wear resistant materials: low alloy tool steels, high alloy high speed steels, and cemented tungsten carbide. High speed steels are either tungsten enriched, whereby the major alloying element is tungsten; or molybdenum enriched, where the major alloying element is molybdenum. Tungsten enriched high-speed steels have numerous disadvantages including the limited availability of tungsten, high hardening temperatures and greater risk of decarburization during heat treatment.

Metals such as aluminum or silicon and transition metals, such as Ti, V and Cr (elements from Groups IVa, Va, VIa in the Periodic Chart) form compounds with the elements B, C, N and O. Because these boride, carbide, nitride and oxide compounds have extremely high melting points, they are refractory. They are commonly used to coat cutting tools, including taps, because of their high-temperature strength (hardness), abrasive wear resistance, extreme chemical stability and limited solubility in the work material.

There are numerous spiral pointed taps designed with an overall length that conforms to DIN standard 376 with an ASME B94.9 shank diameter. These taps are made from molybdenum-enriched high-speed steel and may have an optional coating of metal nitride, carbide or carbonitride. However, these taps do not include an asymmetrical straight flute that reduces torque when cutting is extended past the tap's chamfered section as the tap wears. Other taps that conform to the DIN standard 376 overall length and an ASME B94.9 shank diameter may be made of tungsten-enriched high-speed steel, instead of molybdenum-enriched high-speed steel. However, because these taps are made of tungsten-enriched high-speed steel, these taps have the disadvantage of the limited availability of tungsten, higher density, decreased hardenability and higher required hardening temperature during heat treatment. Therefore, these taps have limited utility.

In addition, other known spiral pointed taps have an overall length and shank diameter that both conform to ASME B94.9. These taps include an asymmetrical straight flute form having 8–12° rake angle, an angular spiral point having a 10–14° chordal hook angle, and these tap embodiments optionally included a coating of titanium nitride or titanium carbonitride. However, the prior art taps described in this paragraph do not have an overall length according to DIN standard 376, and thus cannot access on computer numerically controlled (CNC) machine tools tapped holes on parts with complicated shapes or deeply recessed holes. As a result, these taps have limited utility. It is desirable to manufacture a tap that lowers tapping torque to improve the performance of the tap, as well as to extend the useful life of the tap.

SUMMARY OF THE INVENTION

To solve these and other problems associated with conventional tap tools, the inventors of the present invention have developed a low torque tap comprising a shank portion with driving square and a thread cutting portion. The tap is made of molybdenum-enriched high-speed steel, has an overall length according to DIN standard 376, and a shank diameter and driving square manufactured according to ASME B94.9. The tap has at least one asymmetrical straight flute with a positive rake angle between about 5 and 15 degrees, and at least one spiral point formed at an angle with respect to a longitudinal axis of the tap with a chordal hook angle between about 5 and 15 degrees. For tapping ferrous materials, the tap is coated with a transition metal nitride, carbide or oxide. For tapping non-ferrous metals, a tap manufactured from high speed steel with an asymmetrical straight flute and short fluted spiral pointed cutting section is coated with a layer containing carbon.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
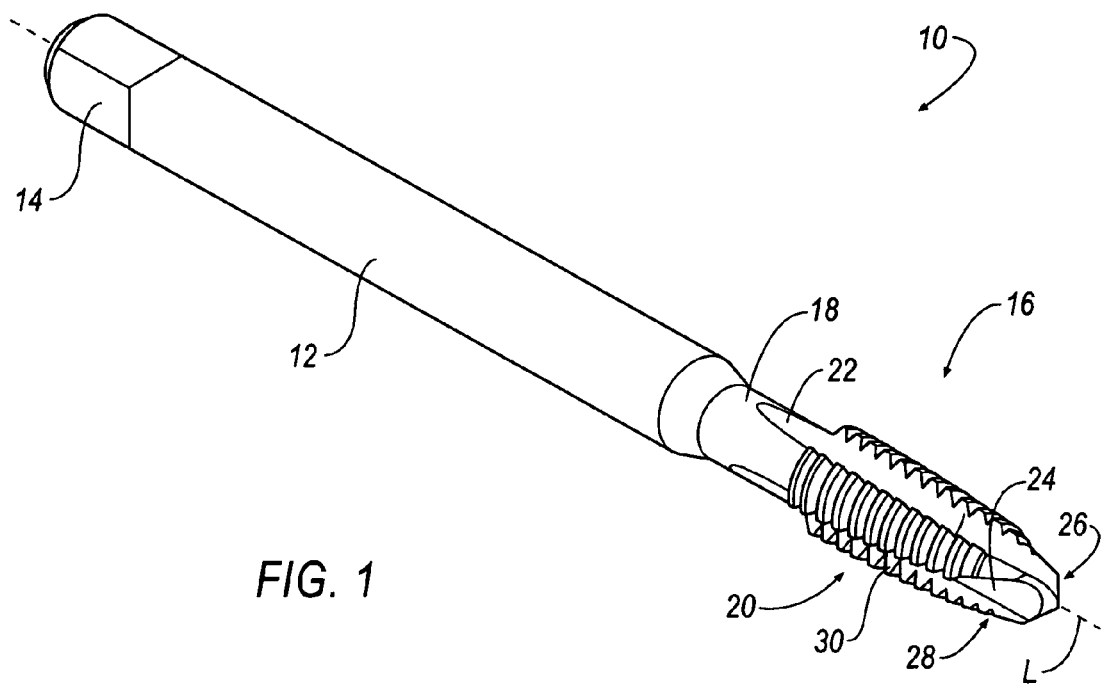
FIG. 1 shows a perspective view of a low torque tap according to an embodiment of the invention.
Figure 2:
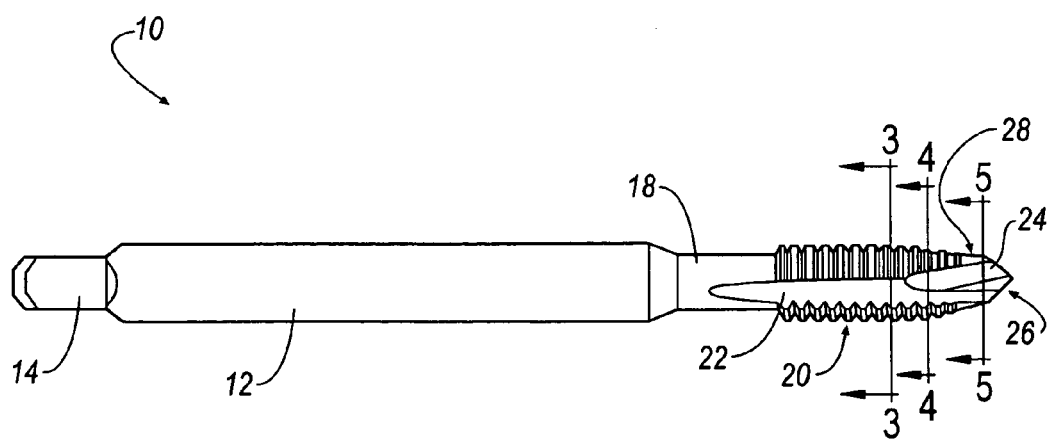
FIG. 2 shows an elevation view of the low torque tap according to an embodiment of the invention.

Referring now to FIGS. 1 and 2, a tap, shown generally at 10, includes a shank portion 12 with a driving square 14, and a thread cutting portion 16. The tap 10 may also include an optional neck portion 18 between the shank portion 12 and the thread cutting portion 16 with a diameter less than the shank portion 12 and thread cutting portion 16.

The thread cutting portion 16 includes a threaded body 20 with one or more asymmetrical straight flutes 22 that run essentially parallel to a longitudinal axis, L, of the tap 10. The thread cutting portion 16 also includes one or more short angular flutes or spiral points 24 at a forward end 26 of the thread cutting portion 16. The thread cutting portion 16 also includes a tapered chamfer 28 that allows the tap 10 to enter a hole (not shown) in the work material to be tapped.

Although the tap 10 can be manufactured from a wide variety of different tool materials, the tap 10 is preferably made from a high-speed steel alloy material because such an alloy material has an optimum combination of wear resistance and edge strength. Specifically, the tap 10 of the invention is preferably made of molybdenum-enriched high-speed steel with the following alloy content: about 0.8 to 1.3% carbon, about 3 to 4.5% chromium, about 6 to 10% molybdenum, about 0 to 5% tungsten, and about 1 to 3% vanadium, and only a residual amount of Co (generally less than about 0.5%).

The tap 10 is manufactured from bars of the preferred high-speed steel alloy by cutting blanks to length. For machine screw sizes #6 through ⅜" (M10) and smaller, the diameter of the shank portion 12 and the thread cutting portion 16 are approximately the same. For smaller sizes, the shank portion 12 may be larger in diameter than the thread cutting portion 16. Conversely, for larger sizes, the shank portion 12 may be smaller in diameter than the thread cutting portion 16. For convenient access of the tap to the part being tapped, it is preferred that the tap 10 has an overall length according to DIN standard 376, and for use with frequently used tap holders, a shank diameter and driving square in accordance with American National Standard Institute, ASME B94.9.

The preferred tap overall lengths and shank diameters are listed in the following table according to the nominal tap diameter. The optional neck portion 18 may have a diameter smaller than the shank portion 12 or the thread cutting portion 16. The optional neck portion 18 may be formed without affecting the length of the tap blank by turning or grinding the tap blank.

| Tap Nominal Diameter | | | | Nominal |
|---|---|---|---|---|
| Machine Screw Sizes | Fractional Diameter (inches) | Metric Diameter (millimeters) | Nominal Overall Tap Length (inches) | Tap Shank Diameter (inches) |
| 4 | | | 2.20 | 0.141 |
| 5 | | 3 | 2.20 | 0.141 |
| 6 | | 3.5 | 2.20 | 0.141 |
| 8 | | 4 | 2.48 | 0.168 |
| 10 | | 4.5,5 | 2.76 | 0.194 |
| | ¼ | 6 | 3.15 | 0.255 |
| | 5/16 | 8 | 3.54 | 0.318 |
| | ⅜ | 10 | 3.94 | 0.381 |
| | 7/16 | | 3.94 | 0.323 |
| | ½ | 12 | 4.33 | 0.367 |
| | 9/16 | 14 | 4.33 | 0.429 |
| | ⅝ | 16 | 4.33 | 0.480 |
| | ¾ | 18 | 4.92 | 0.590 |

The invented tap, manufactured to the lengths and shank diameters listed above, has advantages over taps whose length and shank diameter are both in accordance with ASME B94.9. For example, a prior art tap with a nominal shank diameter of about ¼ inches would have a nominal overall length of about 2.50 inches when manufactured in accordance with ASME B94.9, but the tap 10 has a nominal overall length of about 3.15 inches when manufactured according to DIN standard 376 of the invention. Similarly, prior art taps with nominal #4 machine screw size and 12 mm shank diameters would have overall lengths of 1.88 inches and 3.38 inches, respectively, in accordance with ASME B94.9, but have overall lengths of about 2.20 and 4.33 inches, respectively, when manufactured according to DIN standard 376 of the invention. The additional overall length permits greater access to the part being tapped, particularly when the tap is used on automated CNC equipment to machine parts with complicated shapes and to tap holes in deep recesses.

After the tap 10 is cut to length and the diameters of the shank portion 12 and/or the thread cutting portion 16 are turned, the tap 10 is hardened in either a salt bath or a vacuum furnace, and tempered to the final desired hardness and metallurgical structure by use of well-known heat treating processes. Normally, the shank portion 12 and major diameter of the thread cutting portion 16 is ground to a final diameter after heat treatment.

Subsequently, the asymmetrical straight flutes 22 are ground or milled along and past the threaded body 20 in a direction generally parallel to the longitudinal axis, L, of the tap 10. The asymmetrical straight flutes 22 provide access of coolant to the tapered chamfer 28 and provide cutting during tapping after wear of the cutting edges of the tapered chamfer 28.

Figure 3:
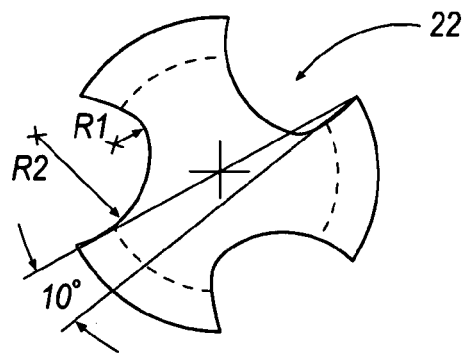
FIG. 3 shows a sectional view of the low torque tap of the invention taken along line 3—3 of FIG. 2.
Figure 4:
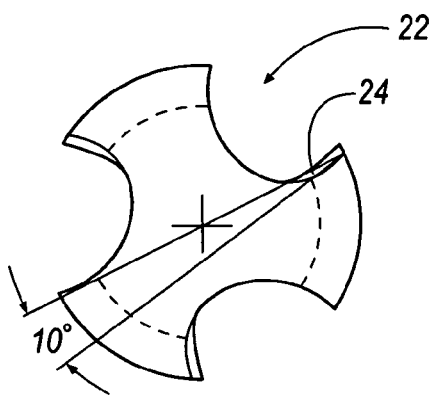
FIG. 4 shows a sectional view of the low torque tap of the invention taken along line 4—4 of FIG. 2.
Figure 5:
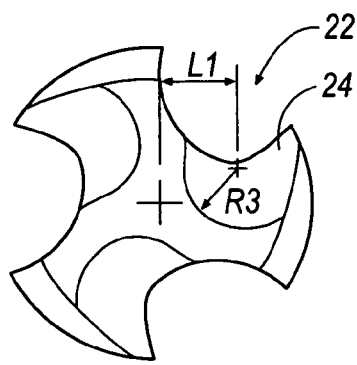
FIG. 5 shows a sectional view of the low torque tap of the invention taken along line 5—5 of FIG. 2.
Figure 6:
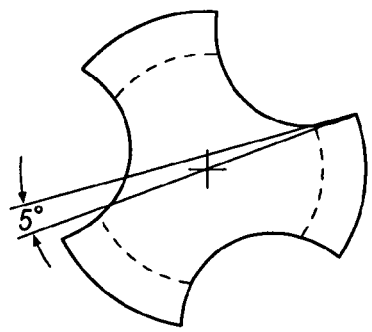
FIG. 6 shows a sectional view of a conventional tap with a symmetrical flute form taken along line 3—3 of FIG. 2.

The configuration of the asymmetrical straight flutes 22 of the tap 10 of the invention is shown in FIGS. 3–5, and the configuration of the straight flutes of a conventional tap, as shown in FIG. 6. As shown in FIG. 6, the form of the straight flutes of a tap with a symmetrical flute form is typically a full radius. An undesirable consequence of this design is a negative chordal hook, for example, an angle of about −5 degrees, as shown in FIG. 6. When the tap cutting face is curved as shown in FIG. 6, the chordal hook angle is defined by the angle between a line from the tap cutting edge and the center of the tap and a second line between the tap cutting edge and extending to the intersection of the cutting face and the thread minor diameter.

To reduce tapping torque and enhance tap life, it has been determined that the cutting edges should ideally have a positive rake or chordal hook angle between about 5 and 15 degrees for tapping steel alloys. As shown in FIG. 3, the asymmetrical straight flutes 22 of the tap 10 have a more complex asymmetrical shape that is provided by a straight cutting face, oriented at the desired rake angle, and tangent to a small blending radius, R1, that is tangent in turn to a larger radius, R2, that defines the full width of the straight flute 22. Formed in this manner, the asymmetrical straight flutes 22 of the tap 10 can be ground to have the desired rake or chordal hook angle. The selection of the desired rake angle or chordal hook angle may depend on the specific grade of steel being tapped. For example, these angles may be 5 to 7 degrees for tapping hardened steels, 8 to 10 degrees for tapping annealed alloy steel, 10 to 12 degrees for tapping annealed carbon steel, and 13 to 15 degrees for tapping stainless steel. For practicality, the rake or chordal hook angle of the asymmetrical straight flutes may be set at one angle within the range 5 to 15 degrees for tapping all material and only the rake or chordal hook angle of the spiral point 24 changed according to the material being tapped. When the tap cutting face is straight as shown in FIG. 3, the rake angle is defined by the angle between a line from the tap cutting edge and the center of the tap and the straight line defining the cutting face.

After the asymmetrical straight flutes 22 are ground, one or more short angular flutes or spiral points 24 are ground at an angle to the longitudinal axis, L, of the tap 10. Designed in conjunction with the straight flutes, these short angular flutes or spiral points 24 form the primary cutting faces of the tap 10, and because of their angular orientation, the flutes 24 direct the chips ahead of the motion of the tap 10, thereby preventing the chips from interfering with the tapping action. As shown in FIG. 4, the preferred rake or chordal hook angle of the spiral points 24, measured at a position past the tapered chamfer 28 of the tap 10 (indicated at line 4—4 of FIG. 2), is generally about 5 to 15 degrees for tapping steel alloys, but depending on the specific steel alloy being tapped may be 5 to 7 degrees for tapping hardened steels, 8 to 10 degrees for tapping annealed alloy steel, 10 to 12 degrees for tapping annealed carbon steel, and 13 to 15 degrees for tapping stainless steel. As a specific example, the preferred rake or chordal hook angle of the spiral points 24 may be about 10 degrees for tapping steel alloys containing chromium and/or molybdenum. The preferred rake or chordal hook angle is achieved during grinding by the radius, R3, of the spiral point 24 shown in FIG. 5, and the offset, L1, of the center of the radius, R3, from the centerline of the tap 10.

Designed in conjunction with the asymmetrical straight flute 22 having a positive rake or chordal hook of 5 to 15 degrees, the geometry of the spiral points 24 may be further refined. It has been found that the useful life of taps in the range from about #6 machine screw size through about one-half (½) inch diameter is maximized if three flutes are used. For three-fluted taps, it has been found that the tapping torque may be minimized when the spiral point 24 is ground at an angle of approximately 12 to 15 degrees with respect to the longitudinal axis, L, of the tap 10. In addition, it has been found that the tapping torque may be minimized when the radius, R3, of the spiral point 24 is approximately 19 to 22 percent of the tap major diameter, and the offset, L1, of the center of the radius, R3, from the centerline of the tap 10 is approximately 22 to 32 percent of the tap major diameter measured from the centerline of the tap 10, as shown in FIG. 5. The use of this geometrical combination may be used effectively on taps without limit to specific grade of high speed steel, tap length and shank diameter or coating.

In the next step, the threaded body 20 is ground to form V-shaped thread flank surfaces 30, along with minor and major diameters, on a helix. Subsequently, the shape of the thread cutting chamfer portion is formed by grinding. The V-shaped thread flank surfaces 30 and major diameter replicate the internal screw thread that is generated during tapping. The tapered chamfer 28 allows entry into the hole of the work material to be tapped.

As a final step in the process, the tap 10 is coated with a wear resistant, low friction layer or coating (not shown) of metal nitrides, carbides, carbonitrides, borides and/or oxides, wherein the metal is chosen from on or more of the following: aluminum, silicon and the transition metals from Groups IVa, Va, and VIa of the Periodic Chart. This wear resistant coating is deposited as a single monolayer or in multiple, including alternating layers. Because steel alloy work materials do not adhere to these coatings, friction, and consequently torque, is reduced, and tap life is significantly extended.

The use of metal nitride, carbide and carbonitrides coatings are not effective in non-ferrous work materials, such as aluminum, titanium, zinc, or the like. Such non-ferrous materials gall or adhere to these coatings and increase tapping torque. It has been found that a spiral pointed high speed steel tap with an asymmetrical straight flute coated with a layer of carbon, or carbon and one or more transition metals selected from the group IVa, Va and Via of the Periodic Chart can be effectively used in such non-ferrous work materials.

A wear resistant, low friction coating scheme comprises two basic coating regions. One region is a top coating region. The surface of the top region is in contact with the work piece during the cutting operation. The top coating region typically includes at least one layer (or multiple layers) of tribological coating material that has good overall tribological properties (including low friction).

The top outer region may comprise a single layer of molybdenum disulfide. As an alternative, the top outer region comprises a single layer of molybdenum disulfide and a metallic additive. Typical metallic additives include molybdenum, tungsten, chromium, niobium and titanium. The metallic addition may comprise a single metal or a combination of any two or more of these metallic additives. When the top outer coating region comprises a single layer, the thickness thereof is between about 0.1 micrometers and about 10 micrometers.

As an alternative to depositing molybdenum disulfide and the metallic addition as one layer, one can deposit alternating layers of molybdenum disulfide and the metallic addition. One example is the deposition of alternating layers of molybdenum disulfide and titanium. Another example is the deposition of molybdenum disulfide and chromium. In addition to titanium and chromium, other candidates for the metallic addition include molybdenum, tungsten and niobium. Each individual layer of this alternating layer coating scheme (molybdenum disulfide and a metallic addition) has a thickness that ranges between about 0.1 nanometers and about 500 nanometers. The total thickness of this alternating layer of molybdenum disulfide and the metallic addition ranges between about 0.1 micrometers and about 10 micrometers.

As still another alternative to the above schemes for the top outer coating region, one may deposit a single layer of carbon. The single layer of carbon has a thickness that is between about 0.1 micrometers and about 10 micrometers. As an alternative to the single carbon layer, alternating layers of carbon and a transition metal such as, for example, either chromium or titanium may be deposited to form the top coating region. The thickness of each layer of carbon and chromium (or titanium) may range between about 0.1 nanometers and about 500 nanometers. The total thickness of the alternating layers of carbon and chromium or titanium ranges between about 0.1 micrometers and about 10 micrometers.

As yet another alternative to the above schemes for the top outer coating region, the present invention contemplates a carbon nitride ($CN_x$) layer or layers. The value of x may range between about 0.01 and about 1.00. The thickness of a single layer of carbon nitride may range between about 0.1 micrometer and about 10 micrometers. In the case of multiple layers of carbon nitride, the total thickness would range between about 0.1 micrometer and about 10 micrometers.

As still another option for the top outer coating region, the present invention contemplates alternating layers of carbon and transition metal carbide wherein the transition metal is selected from Group IVa, Group Va and Group VIa of the Periodic Chart, for example, tungsten carbide. The thickness of each layer of carbon and metal carbide (e.g., tungsten carbide) may range between about 0.1 nanometers and 500 nanometers. The total thickness of the alternating layers equals between about 0.1 micrometers and about 10 micrometers.

As still another alternative for the top outer coating region, carbon and the transition metal carbide can be co-deposited to form a single layer that comprises the top outer coating region. In the case of a single layer of carbon and transition metal carbide, the thickness of that single layer may range between about 0.1 micrometers and about 10 micrometers.

The second inner coating region comprises a hard, refractory coating scheme. The hard, refractory coating scheme may, as one alternative, comprise alternating coating layers of titanium nitride and silicon nitride. The titanium nitride layer in this usage and in other usages mentioned herein has the formula $TiN_x$ wherein x ranges between about 0.6 and about 1.0. The silicon nitride layer in this usage and in other usages mentioned herein may have the formula $SiN_x$ wherein x ranges between about 0.75 to about 1.333 or $Si_3N_4$. Each individual layer has a thickness that ranges between about 0.1 nanometers and about 500 nanometers. The total thickness of the alternating layers of titanium nitride and silicon nitride ranges between about 0.5 micrometers and about 20 micrometers.

As another alternative, the hard, refractory coating scheme may comprise alternating layers of titanium aluminum nitride and silicon nitride. The titanium aluminum nitride in this usage and in other usages mentioned herein has the formula $(Ti_xAl_{1-x})N_y$ wherein $\chi$ ranges between about 0.25 and about 0.75, and y ranges between about 0.6 and about 1.0. Each individual layer has a thickness that ranges between about 0.1 nanometers and about 500 nanometers. The total thickness of the alternating layers of titanium aluminum nitride and silicon nitride ranges between about 0.5 micrometers and about 20 micrometers.

It should be appreciated that there may be some instances in which the use of the alternating layers of titanium aluminum nitride and silicon nitride may be appropriate in the absence of any other coating scheme that has good tribological properties. The properties of the alternating layers of titanium aluminum nitride and silicon nitride used in the absence of a coating scheme with good tribological properties provides good performance in various applications such as, for example, cutting tools.

As still another alternative for the hard, refractory coating scheme, one may co-deposit titanium and silicon in a reactive nitrogen atmosphere to deposit a single layer (or multiple layers) of titanium silicon nitride. In this usage, as well as in other usages mentioned hereinafter, the titanium silicon nitride has the formula $(Ti_{1-x}Si_x)N_y$ wherein $\chi$ ranges between about 0.01 and about 0.30, and y ranges between about 0.6 and about 1.1. The single layer may have a thickness that ranges between about 0.5 micrometers and about 20 micrometers.

In addition to the top outer coating region and the hard, refractory coating region, there may be an adherence coating scheme. The adherence coating scheme is applied directly to the surface of the substrate. The adherence coating scheme may comprise one or more layers of metals such as, for example, aluminum, silicon, or a transition metal such as, for example, titanium or chromium. The adherence layer may also comprise one or more layers of a nitride of the above elements; namely, aluminum nitride, silicon nitride, and transition metal nitrides such as, for example, titanium nitride and chromium nitride. As an alternative, the adherence layer may comprise the metal layer followed by metal nitride layer. For example, a titanium layer may be followed by a titanium nitride layer. The thickness of the adherence coating region is between about 1 nanometer and about 3000 nanometers.

An adherence coating scheme may also be present so as to be between the top coating region and the hard, refractory coating region. The compositions and properties of this adherence coating scheme are the same as those described hereinabove for the adherence coating scheme that is between the hard, refractory coating region and the substrate.

As a further optional step, the optional wear resistant, low friction coating or layer may be coated with a second outer friction-reducing layer (not shown) comprised of molybdenum disulfide, molybdenum disulfide (to be consistent with previous references) and transition metal carbides, carbon and transition metal carbides, carbon and a transition metal, carbon, and carbon nitride. The second outer friction-reducing layer can be deposited as a single monolayer or in multiple layers, including alternating layers. The friction-reducing layer effectively further reduces friction and tapping torque, further extending tap life.

Both the wear resistant, low friction layer and the outer friction-reducing layer may be applied by use of a vapor deposition technique, such as one of the well-known physical vapor deposition (PVD) techniques, for example, any high ion density process, such as ion plating, magnetron sputtering, arc evaporation, or the like.

In order to create the desired form, it should be appreciated that other methods or sequences of manufacturing can be used than that described herein.

The invented tap has advantages over current art through the combination of elements described herein. Tests were conducted to prove the effectiveness of the tap 10 of the invention. For example, when tapping 0.197 inch diameter through holes in ½" thick 4340 alloy steel at 50 sfm with spiral pointed taps designed with a symmetrical flute form, as shown in FIG. 6, and not coated with a wear resistant layer, the initial tapping torque was 36.5 in-lbs and the life was 887 holes. In contrast, the tap 10 of the invention, as shown in FIGS. 1–5, had 29.4 in-lbs torque and the life was 2,296 holes. Further, by use of molybdenum enriched high speed steel, the invented taps have advantages of alloy availability and avoidance of difficulty during heat treatment of otherwise identical tungsten enriched high speed steel taps made to current practice. Likewise, the overall length of invented tap provides easier access to parts with complicated shapes or parts with recessed holes, and may be used with tap holders designed for shanks to ASME B94.9.

The patents and documents described herein are hereby incorporated by reference in their entirety.

While the invention has been specifically described in connection with certain specific embodiments thereof, it is to be understood that this is by way of illustration and not of limitation, and the scope of the appended claims should be construed as broadly as the prior art will permit.

What is claimed is:

1. A low torque tap having a nominal diameter and comprising a shank portion with driving square and a thread cutting portion, said tap made of molybdenum enriched high speed steel, said tap coated with a layer of metal nitrides, carbides or carbonitrides, said metal chosen from one or more of the following: aluminum, silicon and a transition metal selected from the group IVa, Va, and VIa of the Periodic Chart, said tap having an asymmetrical straight flute forming a positive rake angle between about 5 and 15 degrees, and a spiral point formed at an angle with respect to a longitudinal axis of said tap forming a positive chordal hook angle between about 5 and 15 degrees, wherein the nominal diameter of said tap determines an overall length of said tap and a diameter of said shank portion.

2. The tap of claim 1, further comprising a neck portion between said shank portion and said thread cutting portion.

3. The tap of claim 1, wherein said molybdenum enriched high speed steel consists essentially of about 0.8% to 1.3% carbon, about 3% to 4.5% chromium, about 6% to 10% molybdenum, about 0% to 5% tungsten, and about 1% to 3% vanadium.

4. A low torque tap having a nominal diameter and comprising a shank portion and a thread cutting portion, said tap made of a high speed steel, said tap having an asymmetrical straight flute and a spiral point formed at an angle with respect to a longitudinal axis of said tap forming a positive chordal hook angle, wherein said high speed steel consists essentially of about 0.8% to 1.3% carbon, about 3% to 4.5% chromium, about 6% to 10% molybdenum, about 0% to 5% tungsten, and about 1% to 3% vanadium, wherein said tap is coated with a layer of one of metal nitrides, carbides and carbonitrides, said metal chosen from one or more of the following: aluminum, silicon and a transition metal selected from the group IVa, Va, and VIa of the Periodic Chart, and wherein the nominal diameter of said tap determines an overall length of said tap and a diameter of said shank portion.

5. The tap of claim 4, wherein said asymmetrical straight flute forms a positive rake angle between about 5 and 15 degrees.

6. The tap of claim 4, wherein said high speed steel further includes a residual amount of cobalt.

7. The tap of claim 4, further comprising a neck portion between said shank portion and said thread cutting portion.

8. The tap of claim 4, wherein said shank portion further comprises a driving square.

9. A method of manufacturing a low torque tap having a nominal diameter, comprising the steps of:

forming a shank portion and a thread cutting portion made of a molybdenum enriched high speed steel;

forming an asymmetrical straight flute with a positive rake angle between about 5 and 15 degrees; and forming a short fluted spiral pointed cutting section formed at an angle with respect to a longitudinal axis of said tap to define a positive chordal hook angle, whereby the nominal diameter of said tap determines an overall length of said tap and a diameter of said shank portion.

10. The method of claim 9, whereby said positive chordal hook angle is between about 5 and 15 degrees.

11. The method of claim 9, whereby said high speed steel consists essentially of about 0.8% to 1.3% carbon, about 3% to 4.5% chromium, about 6% to 10% molybdenum, about 0% to 5% tungsten, and about 1% to 3% vanadium.

12. The method of claim 9, wherein said tap is coated with a layer of one of metal nitrides, carbides and carbonitrides, said metal chosen from one or more of the following: aluminum, silicon and a transition metal selected from the group IVa, Va, and VIa of the Periodic Chart.

13. A low torque tap comprising a shank portion with driving square and a thread cutting portion, said tap made of high speed steel, said tap coated with a layer of carbon, or carbon and one or more transition metals selected from the group IVa, Va and VIa of the Periodic Chart, said tap having an asymmetrical straight flute forming a positive rake angle between about 5 and 15 degrees, and a spiral point formed at an angle with respect to a longitudinal axis of said tap forming a positive chordal hook angle between about 5 and 15 degrees.

14. The tap of claim 13, further comprising a neck portion between said shank portion and said thread cutting portion.

15. The tap of claim 13, wherein said high speed steel consists essentially of about 0.8% to 1.3% carbon, about 3% to 4.5% chromium, about 6% to 10% molybdenum, about 0% to 5% tungsten, about 1% to 3% vanadium, and a residual amount of cobalt.

16. The tap of claim 13, wherein said tap further comprises a nominal diameter that determines an overall length of said tap and a diameter of said shank portion.

17. A low torque tap comprising a shank portion with driving square and a thread cutting portion, said tap made of a high speed steel, said tap having three asymmetrical straight flutes forming a positive rake angle between about 5 and 15 degrees, and a spiral point formed at a predetermined angle with respect to a longitudinal axis of said tap, said spiral point having a positive chordal hook angle, whereby the spiral point has a radius of approximately 19 to 23 percent measured relative to a major diameter of said tap, and whereby a centerline of the radius is offset from a centerline of said tap by approximately 22 to 32 percent measured relative to the major diameter of said tap.

18. The tap of claim 17, further comprising a neck portion between said shank portion and said thread cutting portion.

19. The tap of claim 17, wherein said high speed steel consists essentially of about 0.8% to 1.3% carbon, about 3% to 4.5% chromium, about 6% to 10% molybdenum, about 0% to 5% tungsten, and about 1% to 3% vanadium.

20. The tap of claim 17, wherein the predetermined angle of said spiral point is approximately 10 to 15 degrees with respect to the longitudinal axis of said tap.

21. The tap of claim 17, wherein said tap is coated with a layer of one of metal nitrides, carbides and carbointrides, said metal chosen from one or more of the following: aluminum, silicon and a transition metal selected from the group IVa, Va, and VIa of the Periodic Chart.

22. The tap of claim 17, wherein said tap is coated with a layer of carbon, or carbon and one or more transition metals selected from the group IVa, Va and VIa of the Periodic Chart.

23. The tap of claim 17, wherein the predetermined angle is approximately 12 to 15 degrees.

24. The tap of claim 17, wherein said tap further comprises a nominal diameter that determines an overall length of said tap and a diameter of said shank portion.

* * * * *